US008087628B2

(12) United States Patent
Chen et al.

(10) Patent No.: US 8,087,628 B2
(45) Date of Patent: Jan. 3, 2012

(54) FIXING MECHANISM FOR FIXING A DISPLAY AND RELATED DISPLAYING DEVICE

(75) Inventors: Dong-Ying Chen, Taipei Hsien (TW); Hung-Chang Huang, Taipei-Hsien (TW)

(73) Assignee: Wistron Corporation, Xizhi Dist., New Taipei (TW)

( * ) Notice: Subject to any disclaimer, the term of this patent is extended or adjusted under 35 U.S.C. 154(b) by 359 days.

(21) Appl. No.: 12/413,605

(22) Filed: Mar. 30, 2009

(65) Prior Publication Data

US 2010/0171006 A1     Jul. 8, 2010

(30) Foreign Application Priority Data

Jan. 5, 2009     (CN) ...................... 2009 2 0000068 U (51) Int. Cl.
*A47B 96/06*     (2006.01)
*E04G 5/06*     (2006.01)

(52) U.S. Cl. .................... 248/231.41; 248/921; 248/922; 248/229.1; 248/229.14; 248/229.24; 248/229.22; 248/316.4; 248/229.11; 248/229.21; 361/679.02; 361/679.21

(58) Field of Classification Search ............. 248/297.21, 248/921, 922, 371, 229.1, 229.14, 229.24, 248/229.12, 229.22, 231.41, 231.61, 316.4, 248/316.6, 346.03, 346.06, 136, 144, 150, 248/154, 222.13, 221.11, 223.41, 229.11, 248/229.21; 269/254 CS
See application file for complete search history.

(56) References Cited

U.S. PATENT DOCUMENTS

| | | | | | |
|---|---|---|---|---|---|
| 2,567,771 | A | * | 9/1951 | Hurd | 33/194 |
| 4,657,216 | A | * | 4/1987 | Southgate | 248/187.1 |
| 5,457,745 | A | * | 10/1995 | Wang | 379/454 |
| 5,694,468 | A | * | 12/1997 | Hsu | 379/446 |
| 5,903,645 | A | * | 5/1999 | Tsay | 379/455 |
| 5,915,658 | A | * | 6/1999 | Sheng | 248/346.06 |
| 5,947,359 | A | * | 9/1999 | Yoshie | 224/570 |
| 6,229,893 | B1 | * | 5/2001 | Chen | 379/454 |
| 6,614,908 | B1 | * | 9/2003 | Huang | 379/446 |
| 7,080,812 | B2 | * | 7/2006 | Wadsworth et al. | 248/316.6 |
| 7,232,098 | B2 | * | 6/2007 | Rawlings et al. | 248/121 |
| 7,407,143 | B1 | * | 8/2008 | Chen | 248/309.1 |
| 7,441,734 | B2 | * | 10/2008 | Liou | 248/205.5 |
| 7,540,459 | B2 | * | 6/2009 | Asano et al. | 248/309.1 |
| 7,551,458 | B2 | * | 6/2009 | Carnevali | 361/807 |
| 7,636,133 | B1 | * | 12/2009 | Hsu | 348/794 |
| 7,672,121 | B2 | * | 3/2010 | Li et al. | 361/679.21 |
| 2002/0190176 | A1 | * | 12/2002 | Louh | 248/316.4 |
| 2006/0278788 | A1 | * | 12/2006 | Fan | 248/309.1 |
| 2007/0075208 | A1 | * | 4/2007 | Chen | 248/455 |
| 2009/0084921 | A1 | * | 4/2009 | Tu | 248/313 |

* cited by examiner

*Primary Examiner* — Terrell McKinnon
*Assistant Examiner* — Michael McDuffie
(74) *Attorney, Agent, or Firm* — Winston Hsu; Scott Margo (57) ABSTRACT

A fixing mechanism includes a housing, a clamping component installed on the housing for clamping a display, a driving component connected to the clamping component for driving the clamping component in a first direction, and an elastic component installed inside the housing and connected to the driving component for providing an elastic force to the driving component in a second direction so that the clamping component is capable of clamping the display in a horizontal direction and a perpendicular direction. The first direction and the second direction are different from the horizontal direction and the perpendicular direction.

19 Claims, 11 Drawing Sheets

FIXING MECHANISM FOR FIXING A DISPLAY AND RELATED DISPLAYING DEVICE

BACKGROUND OF THE INVENTION

1. Field of the Invention

The present invention relates to a fixing mechanism for fixing a display and a related displaying device, and more particularly, to a fixing mechanism for fixing a display by elastic force of elastic components and a related displaying device.

2. Description of the Prior Art

In an advanced technology, cathode ray tube (CRT) displays are replaced completely and flat-panel displays (FPD) are main products in a display market. In contrast to huge volume of the conventional cathode ray tube displays, the flat-panel displays have advantages of low power consumption, low radiation, and miniaturized volume. At this time, expansion of dimensions of the flat-panel displays popularizes the miniaturized flat-panel displays in the display market, such as in a domestic display, in an outdoor advertisement, and in an exhibition. A mounting structure for mounting the displays on a surface is used widely nowadays. However most display fixing mechanisms only just can be applied for the displays of certain sizes without flexibility. Thus, design of a display fixing mechanism for tightly fixing displays of various sizes with flexibility is an important issue nowadays.

SUMMARY OF THE INVENTION

According to the claimed invention, a fixing mechanism includes a housing, a clamping component installed on the housing for clamping a display, a driving component connected to the clamping component for driving the clamping component in a first direction, and an elastic component installed inside the housing and connected to the driving component for providing an elastic force to the driving component in a second direction so that the clamping component is capable of clamping the display in a horizontal direction and a perpendicular direction. The first direction and the second direction are different from the horizontal direction and the perpendicular direction.

According to the claimed invention, the housing comprises a back plate and a frame for covering the elastic component with the back plate.

According to the claimed invention, at least one slot is formed on the back plate and the driving component is installed inside the slot in a slidable manner.

According to the claimed invention, a longitudinal direction of the slot is identical to the first direction substantially.

According to the claimed invention, a longitudinal direction of the slot is identical to the second direction substantially.

According to the claimed invention, the driving component comprises at least one pin passing through the slot and connected to the clamping component.

According to the claimed invention, an end of the elastic component is connected to the back plate.

According to the claimed invention, a guiding slot is formed on the frame, and the driving component comprises a handle installed inside and protruding from the guiding slot in a slidable manner.

According to the claimed invention, longitudinal direction of the guiding slot is perpendicular to the perpendicular direction substantially.

According to the claimed invention, the housing comprises a fastening component for fastening a stand of the display.

According to the claimed invention, a groove is formed on the clamping component for wedging a stand of the display.

According to the claimed invention, the first direction is identical to the second direction substantially.

According to the claimed invention, an angle between the first direction or the second direction and the horizontal direction is 42 degrees substantially.

According to the claimed invention, the clamping component comprises two sliding blocks for clamping both sides of the display.

According to the claimed invention, a displaying device includes a display having a screen, a base, and a stand connected to the screen and the base for supporting the screen on the base. The displaying device further includes a fixing mechanism having a housing, a clamping component installed on the housing for clamping the stand of the display, a driving component connected to the clamping component for driving the clamping component in a first direction, and an elastic component installed inside the housing and connected to the driving component for providing an elastic force to the driving component in a second direction so that the clamping component clamps the display in a horizontal direction and a perpendicular direction. The first direction and the second direction are different from the horizontal direction and the perpendicular direction.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
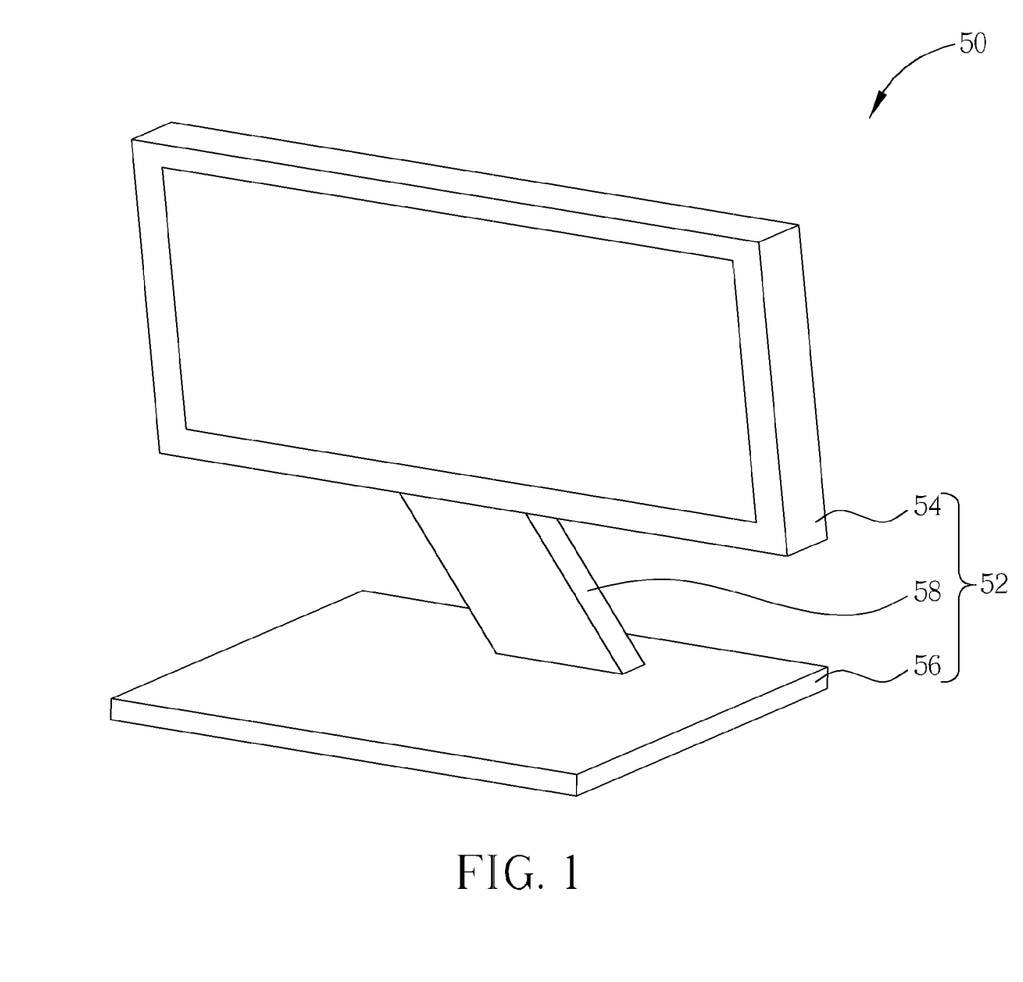
FIG. 1 is a diagram of a displaying device according to a preferred embodiment of the present invention.
Figure 2:
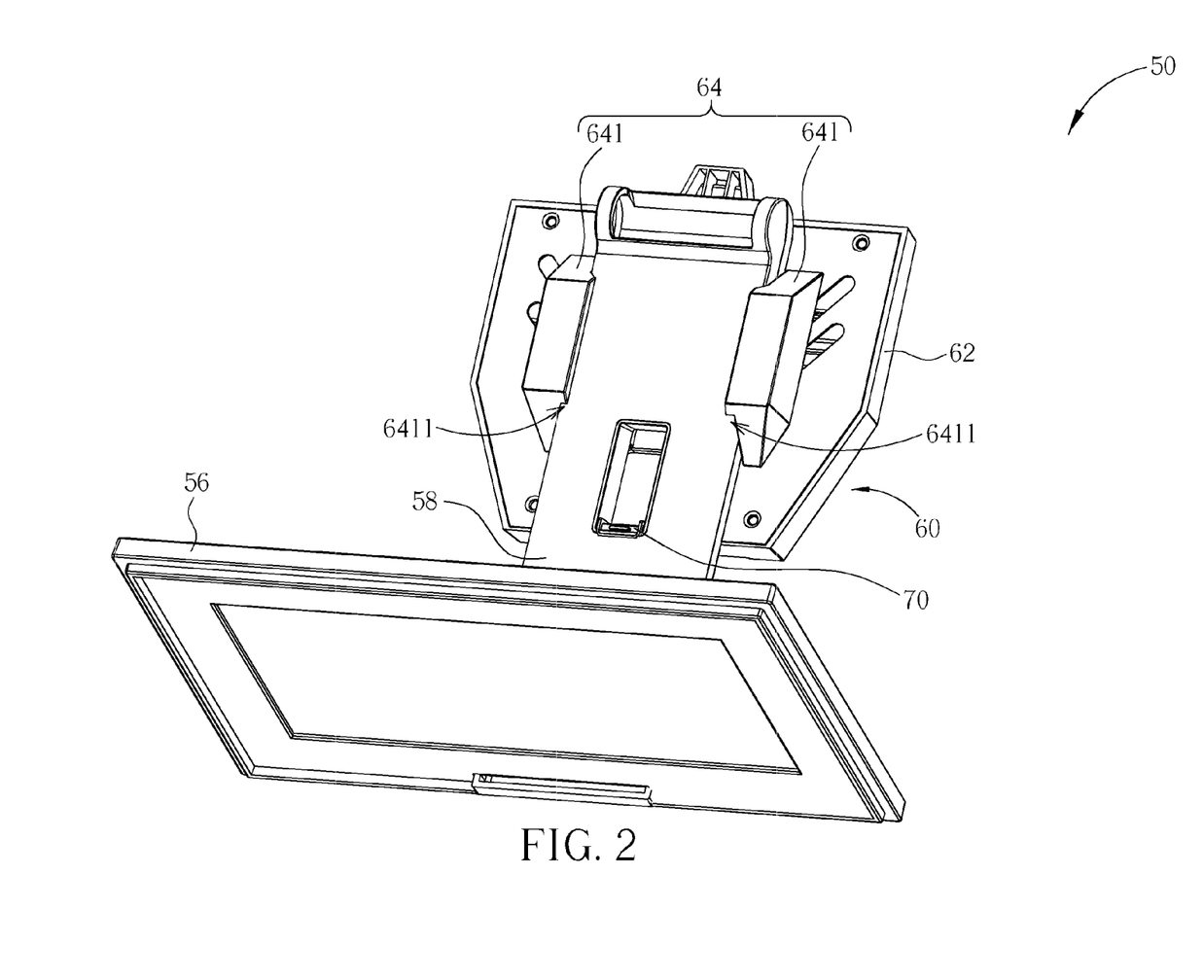
FIG. 2 is a diagram of a fixing mechanism fixing a stand according to the preferred embodiment of the present invention.
Figure 3:
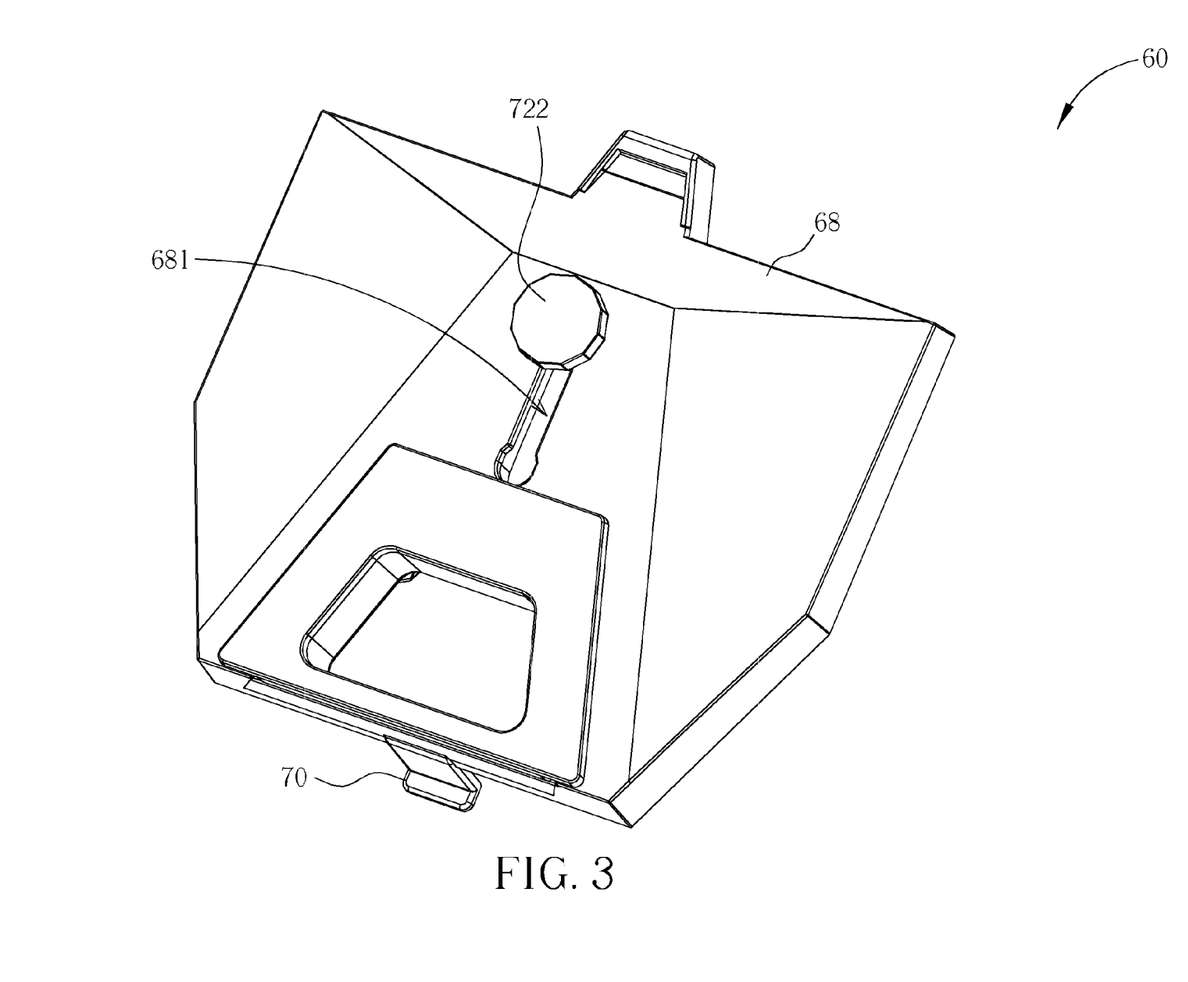
FIG. 3 and FIG. 4 are drawings of the fixing mechanism at different views according to the preferred embodiment of the present invention.
Figure 4:
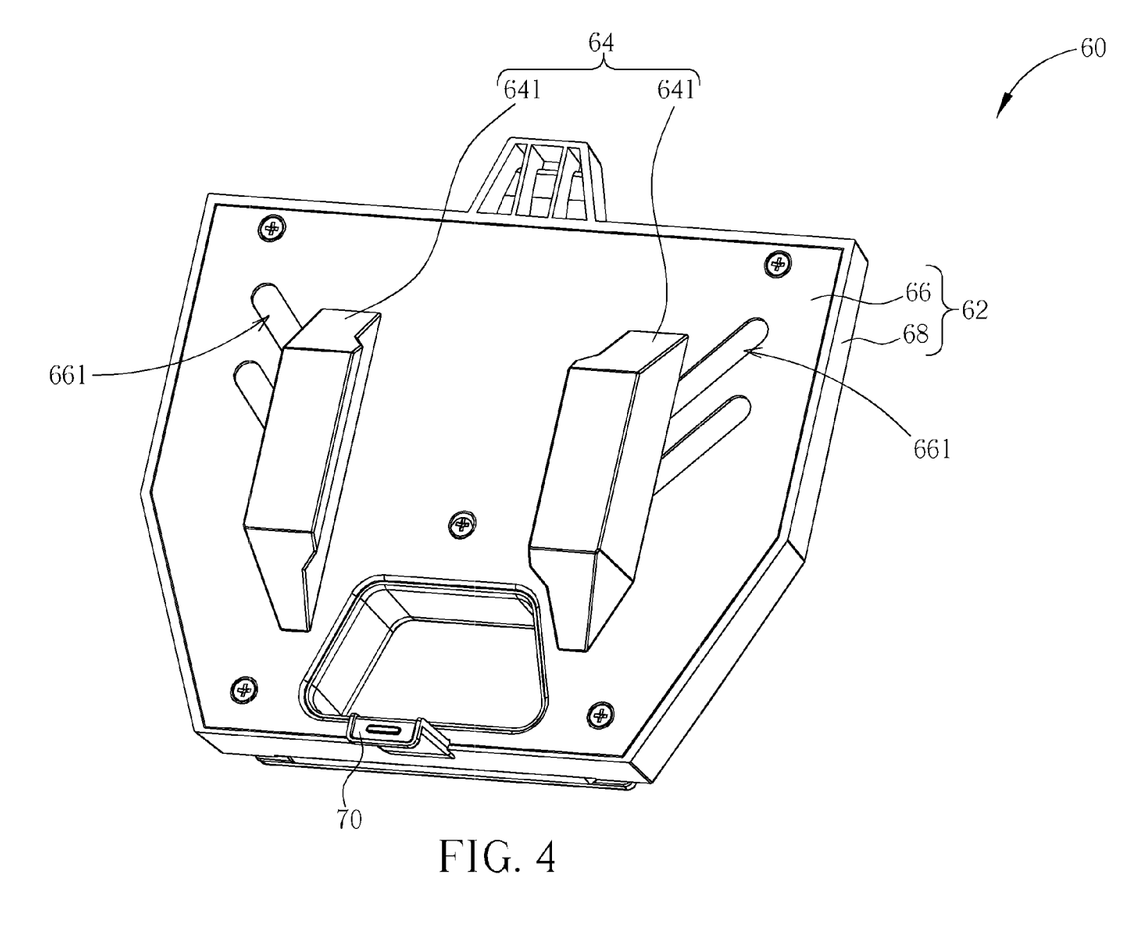

Please refer to FIG. 1. FIG. 1 is a diagram of a displaying device 50 according to a preferred embodiment of the present invention. The displaying device includes a display 52 having a screen 54, a base 56, and a stand 58 connected to the screen 54 and the base 56 for supporting the screen 54 on the base 56. Please refer to FIG. 1 and FIG. 2. FIG. 2 is a diagram of a fixing mechanism 60 fixing the stand 58 according to the preferred embodiment of the present invention. The displaying device 50 further includes the fixing mechanism 60 including a housing 62, and a clamping component 64 installed on the housing 62 for clamping the stand 58. A side of the fixing mechanism 60 is for fixing the stand 58 of the display 52, and the other side of the fixing mechanism 60 can be connected to a computer host. The fixing mechanism 60 also can be a wall mounting mechanism for mounting the display 52 on a wall. Please refer to FIG. 3 and FIG. 4. FIG. 3 and FIG. 4 are drawings of the fixing mechanism 60 at different views according to the preferred embodiment of the present invention. The housing 62 of the fixing mechanism 60 includes a back plate 66 which can be a metal plate, such as an iron plate. The housing 62 of the fixing mechanism 60 further includes a frame 68 for covering inner components with the back plate 66 together. A plurality of slots 661 is formed the back plate 66. The housing 62 further includes a fastening component 70 for fastening the stand 58 of the display 52 as shown in FIG. 1. The fastening component 70 can be a hook. The clamping component 64 includes two sliding blocks 641 for clamping both sides of the stand 58. At least one groove 6411 is formed on each sliding block 641 for wedging the stand 58 of the display 52 tightly.

Figure 5:
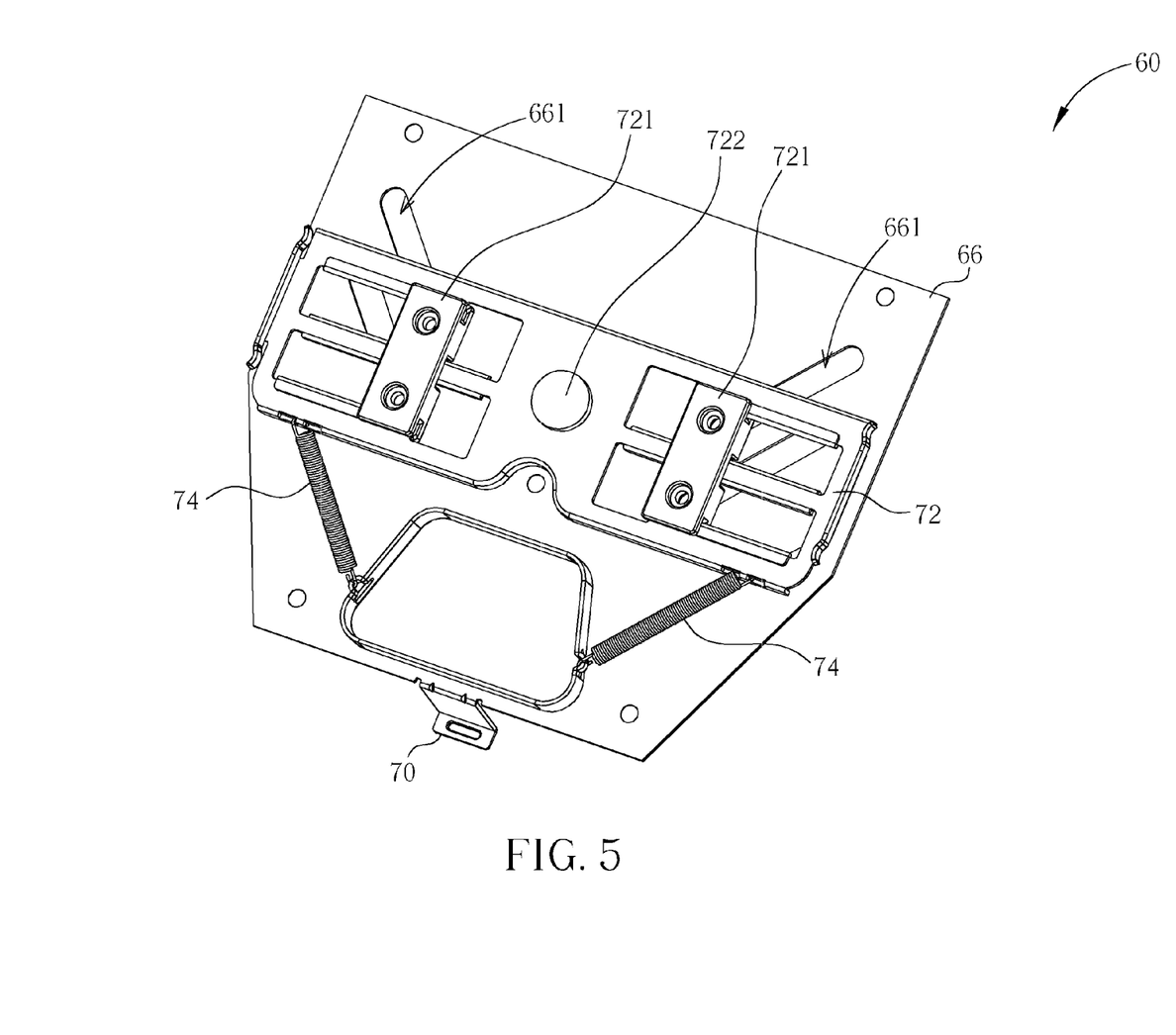
FIG. 5 and FIG. 6 are drawings of inner components of the fixing mechanism according to the preferred embodiment of the present invention.
Figure 6:
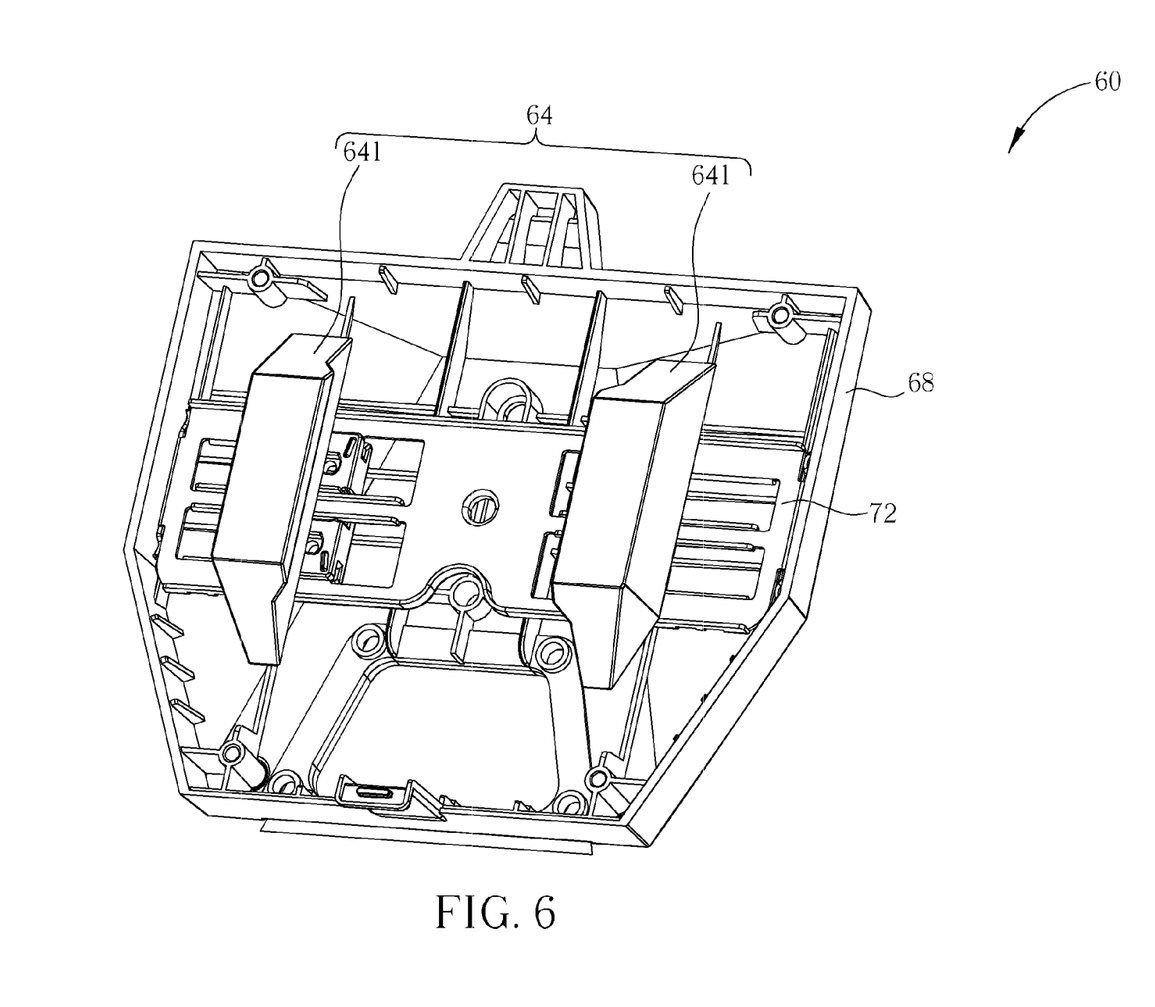
Figure 7:
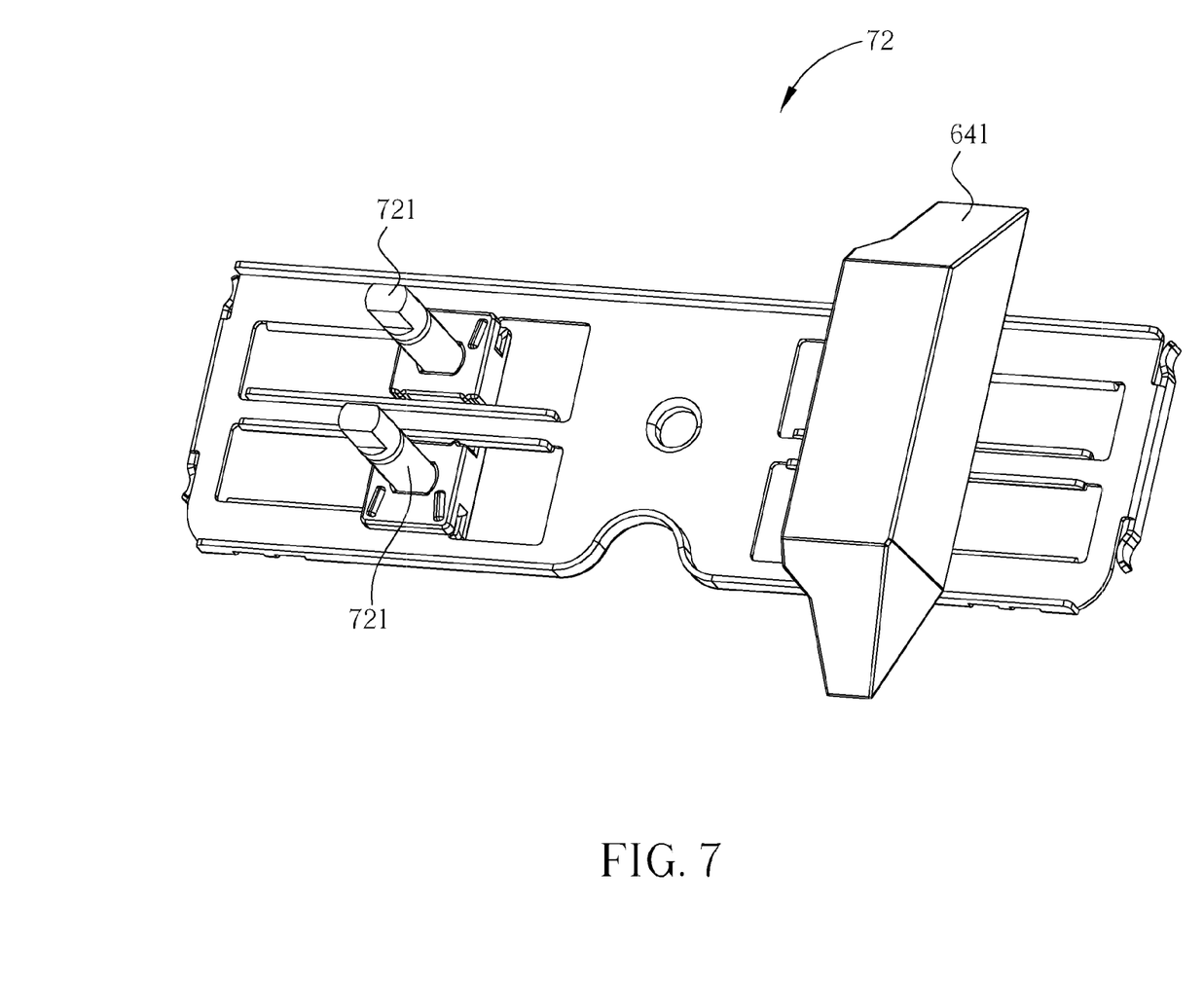
FIG. 7 is a partial drawing of a driving component according to the preferred embodiment of the present invention.

Please refer to FIG. 5 and FIG. 6. FIG. 5 and FIG. 6 are drawings of inner components of the fixing mechanism 60 according to the preferred embodiment of the present invention. For showing inner structure of the fixing mechanism 60 clearly, the frame 68 is omitted to draw in FIG. 5 and the back plate 66 is omitted to draw in FIG. 6. The fixing mechanism 60 further includes a driving component 72 connected to the clamping component 64. Please refer to FIG. 5 to FIG. 7. FIG. 7 is a partial drawing of the driving component 72 according to the preferred embodiment of the present invention. The driving component 72 includes a plurality of pins 721 passing through the slots 661 on the back plate 66 and connected to the two sliding blocks 641 respectively so that the driving component 72 is capable of driving the clamping component 64. A guiding slot 681 is formed on the frame 68. The driving component 72 includes a handle 722 installed inside the guiding slot 681 in a slidable manner and protruding from the guiding slot 681. The fixing mechanism 60 further includes two elastic component 74 installed inside the housing 62. An end of the elastic component 74 is connected to the driving component 72, and the other end of the elastic component 74 is connected to a fixing end, such as the back plate 66. The elastic component 74 can be a spring.

Figure 8:
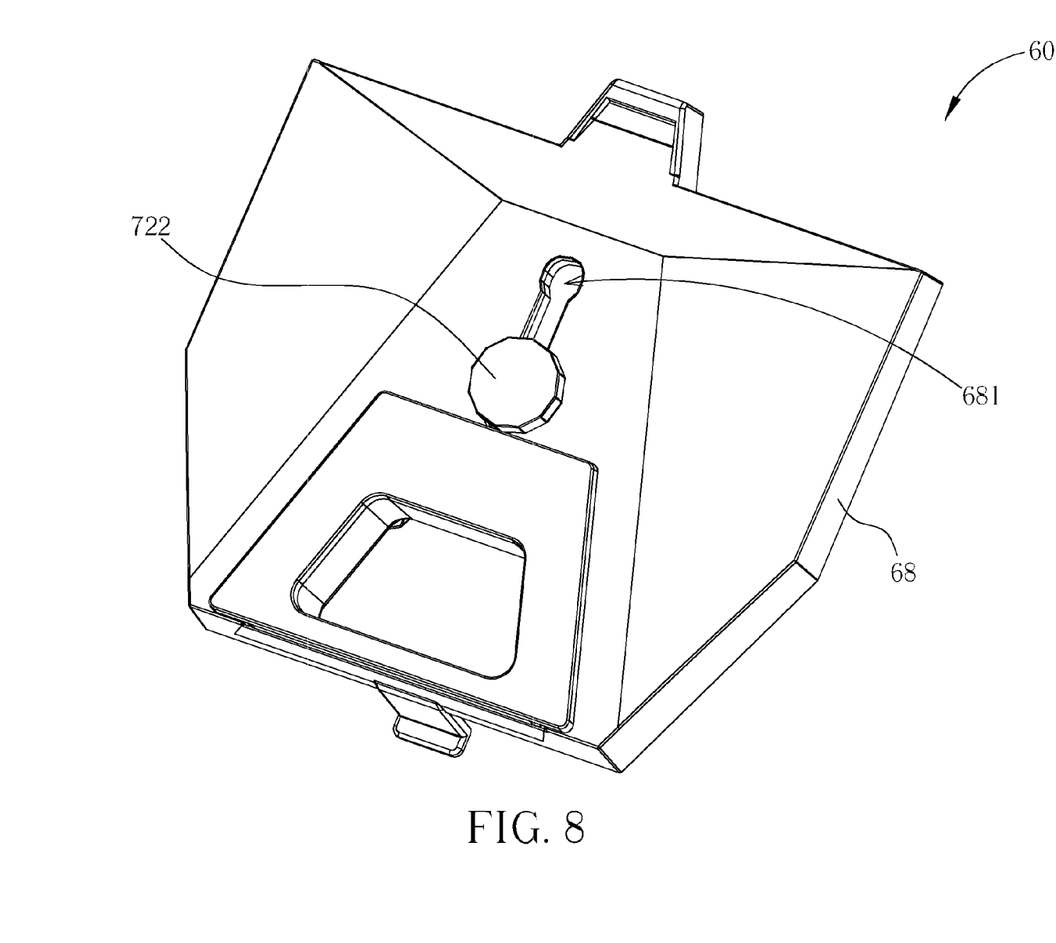
FIG. 8 and FIG. 9 are drawings of a handle of the fixing mechanism located in a first position according to the preferred embodiment of the present invention.
Figure 9:
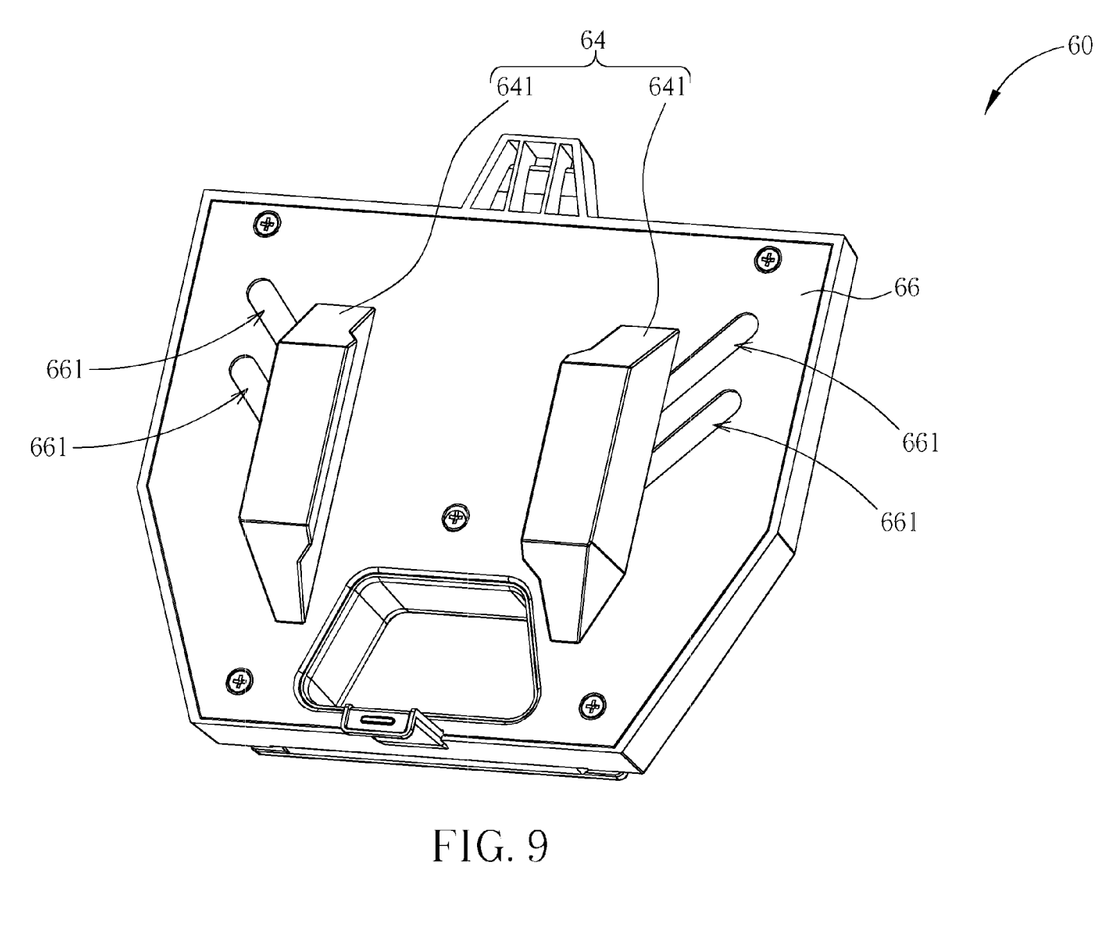
Figure 10:
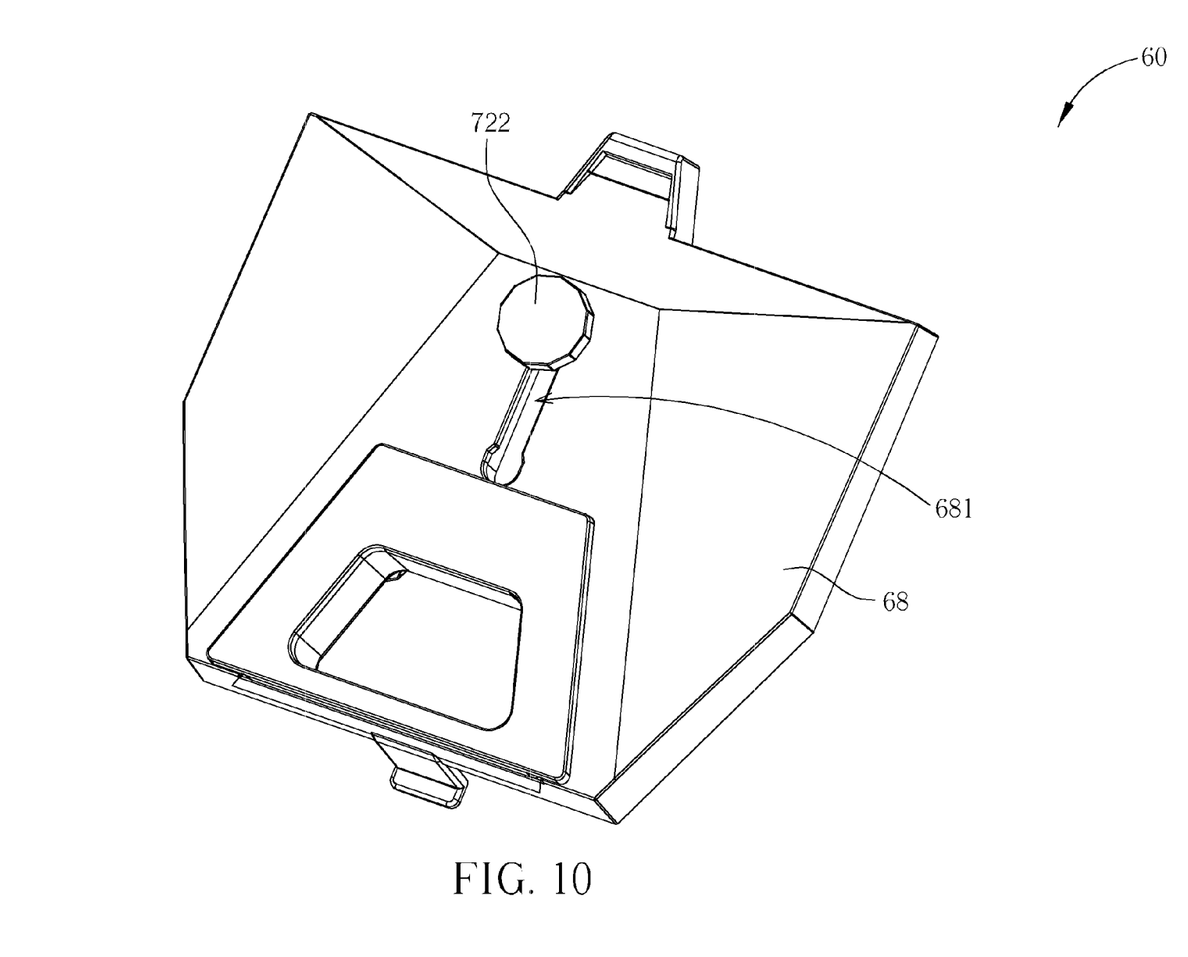
FIG. 10 and FIG. 11 are drawings of the handle of the fixing mechanism located in a second position according to the preferred embodiment of the present invention.
Figure 11:
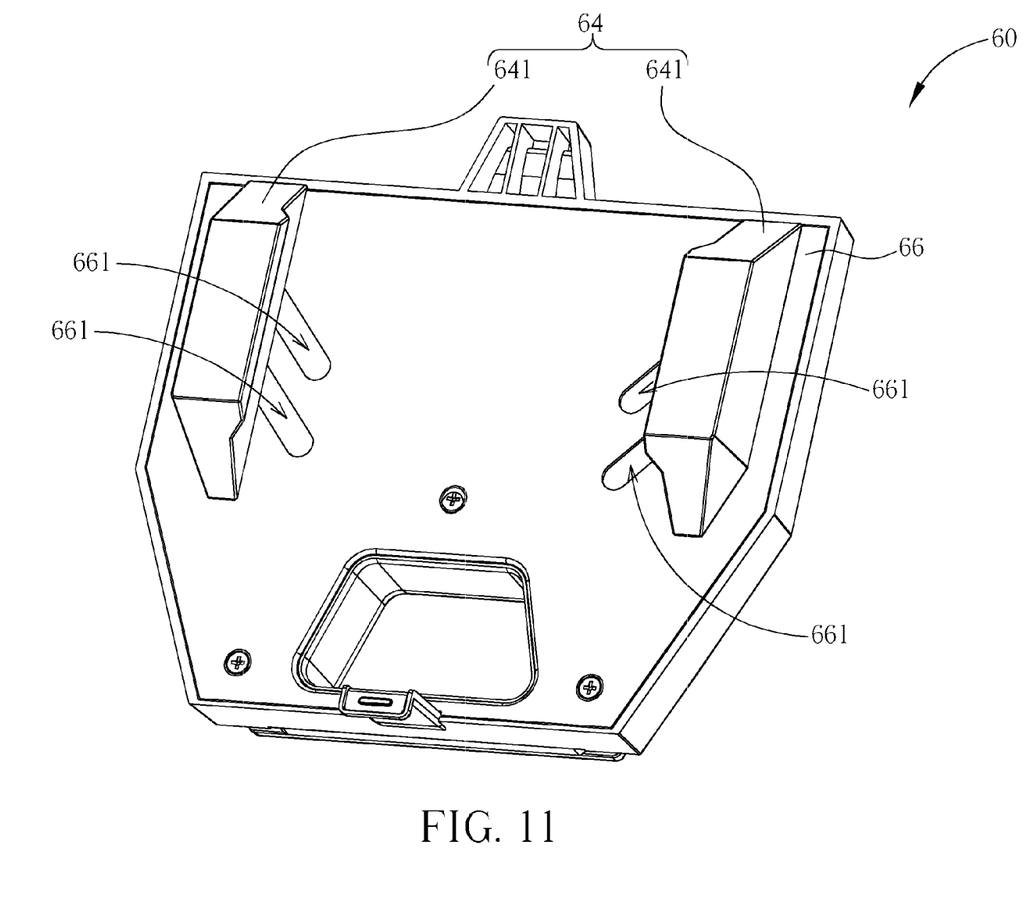

Please refer to FIG. 5 to FIG. 11. FIG. 8 and FIG. 9 are drawings of the handle 722 of the fixing mechanism 60 located in a first position according to the preferred embodiment of the present invention. FIG. 10 and FIG. 11 are drawings of the handle 722 of the fixing mechanism 60 located in a second position according to the preferred embodiment of the present invention. When the handle 722 is pushed from the first position to the second position in the guiding slot 681, the driving component 72 moves upwardly to drive the sliding blocks 641 of the clamping component 64 to move in a first direction in the slots 661 on the back plate 66. A longitudinal direction of the slot 661 is identical to the first direction substantially. At this time, each elastic component 74 connected to the driving component 72 is stretched accordingly so that the elastic component 74 provides an elastic force to the driving component 72 in a second direction for driving the sliding blocks 641 of the clamping component 64 to clamp both sides of the stand 58 in a horizontal direction and a perpendicular direction. The first direction and the second direction are oblique directions and different from the horizontal direction and the perpendicular direction. The first direction can be identical to the second direction substantially. An angle between the first direction or the second direction and the horizontal direction can be 42 degrees substantially. A gap between the two sliding blocks 641 of the clamping component 64 can be adjusted according to position of the handle 722 inside the guiding slot 681 for accommodating the stand 58 of different widths. When the stand 58 is combined with the fixing mechanism 60, the elastic components 74 can apply oblique elastic forces to the driving component 72 so that the sliding blocks 641 of the clamping component 64 clamp the stand 58 obliquely and downwardly, that is, the sliding blocks 641 of the clamping component 64 clamp the stand 58 in the horizontal direction and the perpendicular direction simultaneously. In addition, the groove 6411 of the sliding block 641 can wedge the stand 58 effectively, and the fastening component 70 can hook an opening of the stand 58 so that the fixing mechanism 60 can fix the stand 58 of the display 52 tightly.

In contrast to the prior art, the clamping component of the fixing mechanism of the present invention can be adjusted for accommodating the stand of different widths. The fixing mechanism of the present invention can be utilized for displays of various sizes with flexibility. Additionally, the fixing mechanism of the present invention utilizes the elastic force provided by the elastic component to clamp the display so as to fix the display tightly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A fixing mechanism comprising: a housing; a clamping component installed on the housing for clamping a display; a driving component connected to the clamping component for driving the clamping component in a first diagonal direction; and an elastic component installed inside the housing and connected to the driving component for providing an elastic force to the driving component in a second direction so that the clamping component clamps the display in a horizontal direction and a perpendicular direction, the first diagonal direction and the second direction being different from the horizontal direction and the perpendicular direction.

2. The fixing mechanism of claim 1 wherein the housing comprises a back plate and a frame for covering the elastic component with the back plate.

3. The fixing mechanism of claim 2 wherein at least one slot is formed on the back plate and the driving component is installed inside the slot in a slidable manner.

4. The fixing mechanism of claim 3 wherein the driving component comprises at least one pin passing through the slot and connected to the clamping component.

5. The fixing mechanism of claim 2 wherein an end of the elastic component is connected to the back plate.

6. The fixing mechanism of claim 2 wherein a guiding slot is formed on the frame, and the driving component comprises a handle installed inside and protruding from the guiding slot in a slidable manner.

7. The fixing mechanism of claim 2 wherein the housing comprises a fastening component for fastening a stand of the display.

8. The fixing mechanism of claim 1 wherein a groove is formed on the clamping component for wedging a stand of the display.

9. The fixing mechanism of claim 1 wherein the clamping component comprises two sliding blocks for clamping both sides of the display.

10. A displaying device comprising:
a display comprising:
a screen;

a base; and
a stand connected to the screen and the base for supporting the screen on the base; and
a fixing mechanism comprising:
a housing;
a clamping component installed on the housing for clamping the stand of the display;
a driving component connected to the clamping component for driving the clamping component in a first direction; and
an elastic component installed inside the housing and connected to the driving component for providing an elastic force to the driving component in a second direction so that the clamping component clamps the display in a horizontal direction and a perpendicular direction, the first direction and the second direction being different from the horizontal direction and the perpendicular direction.

11. The displaying device of claim 10 wherein the housing comprises a back plate and a frame for covering the elastic component with the back plate.

12. The displaying device of claim 11 wherein at least one slot is formed on the back plate and the driving component is installed inside the slot in a slidable manner.

13. The displaying device of claim 12 wherein the driving component comprises at least one pin passing through the slot and connected to the clamping component.

14. The displaying device of claim 11 wherein an end of the elastic component is connected to the back plate.

15. The displaying device of claim 11 wherein a guiding slot is formed on the frame, and the driving component comprises a handle installed inside and protruding from the guiding slot in a slidable manner.

16. The displaying device of claim 10 wherein the housing comprises a fastening component for fastening the stand of the display.

17. The displaying device of claim 10 wherein a groove is formed on the clamping component for wedging the stand of the display.

18. The displaying device of claim 10 wherein the clamping component comprises two sliding blocks for clamping both sides of the stand.

19. A fixing mechanism comprising: a housing comprising a fastening component for fastening a stand of a display; a clamping component installed on the housing for clamping the display; a driving component connected to the clamping component for driving the clamping component in a first diagonal direction; and an elastic component installed inside the housing and connected to the driving component for providing an elastic force to the driving component in a second direction so that the clamping component clamps the display in a horizontal direction and a perpendicular direction, the first diagonal direction and the second direction being different from the horizontal direction and the perpendicular direction.

* * * * *